United States Patent
Tan

(10) Patent No.: US 6,339,031 B1
(45) Date of Patent: Jan. 15, 2002

(54) MICROCELLULAR CARBON FOAMS AND MICROCELLULAR C/C COMPOSITES FABRICATED THEREFROM

(76) Inventor: Seng C. Tan, 3591 Apple Grove Dr., Beavercreek, OH (US) 45430

( * ) Notice: Subject to any disclaimer, the term of this patent is extended or adjusted under 35 U.S.C. 154(b) by 0 days.

(21) Appl. No.: 09/222,630

(22) Filed: Dec. 29, 1998

(51) Int. Cl.[7] .................................. B32B 3/26
(52) U.S. Cl. ..................... 442/179; 442/221; 442/226; 428/315.5; 428/315.7
(58) Field of Search ................. 442/179, 221, 442/226; 428/315.5, 315.7

(56) References Cited

U.S. PATENT DOCUMENTS 4,442,165 A * 4/1984 Gebhardt et al. .......... 428/307.7
4,818,448 A * 4/1989 Wrenn, Jr. et al.

FOREIGN PATENT DOCUMENTS

RU 2047588 * 11/1995

* cited by examiner

Primary Examiner—Elizabeth M. Cole

(57) ABSTRACT

A novel class of carbon fiber precursor derived carbon foams and a method for their production are described. A new class of C/C composites comprising unidirectional or woven carbon fabrics in a matrix of the novel carbon foams, and the method for their production are also described.

8 Claims, 5 Drawing Sheets

⊢―――⊣ 500 μm

⊢― 100 μm

MICROCELLULAR CARBON FOAMS AND MICROCELLULAR C/C COMPOSITES FABRICATED THEREFROM

The invention was made with Government support under contracts numbers N00167-97-C-0045 and N00167-98-C-0064 awarded by the Department of the Navy. The Government has certain rights in this invention.

FIELD OF THE INVENTION

The present invention relates to the production and application of a novel class of low-cost microcellular carbon foams and to microcellular carbon/carbon (C/C) composites manufactured therefrom.

BACKGROUND OF THE INVENTION

There is a trend toward the increased use of C/C composites in space structures and satellite components because these materials possess very unique characteristics such as: high specific stiffness, high specific strength, excellent dimensional stability, near zero thermal expansion coefficients, no out-gassing and laser and radiation survivability. Sandwich structures containing such low density, high temperature core materials have many applications for, for example, high speed transport vehicles such as supersonic aircraft and outerspace structures. Conventional carbon foams demonstrate relatively low mechanical properties, such as fracture toughness, due to their amorphous morphology or low level of crystalline orientation. High cost, dictated by the need for long processing times, is also a major shortcoming of these materials.

Conventional glassy carbon foams, i.e. amorphous carbon foams, produced by the pyrolysis and graphitization of thermosetting polymer precursors such as phenolics, are very weak and can be crushed with the fingers. Such materials are therefor used primarily for nonstructural applications such as electrodes.

The carbon foams of the present invention, are preferably crystalline carbon foams produced by the pyrolysis and graphitization of thermoplastic carbon fiber precursors such as mesophase pitch or polyacrylonitrile (PAN). These foams are produced by a process wherein a blowing process aligns the anisotropic pitch molecules along the struts or boundaries of the individual abutting microcells. Such foams are mechanically very strong and can therefore be used in structural applications. They are also good conductors of electricity and heat due to their carbon nature.

Previous attempts to produce crystalline carbon foams have resulted in millimeter-sized bubbles or low levels of crystalline orientation along the struts and consequently resulted in products that demonstrated improved, but still low, fracture toughness. While such low level of crystallinity carbon foams are stronger than amorphous foams, they are brittle and can result in catastrophic failure. This behavior is clearly unacceptable for structural applications. The carbon foams of the present invention have microcellular bubbles.

Current preforms for C/C composites are generally fabricated using weaving techniques. The preforms are then densified with carbon by one of the following techniques: liquid pitch densification, chemical vapor deposition (CVD) densification, or impregnation with a high-char-yield resin. Typically, fabrication requires up to 6 months of processing time using these techniques. The product is therefore, very expensive to make. More recently, C/C composites were processed using carbon preforms infiltrated with a high-char-yield resin and carbonized. This process is repeated about three times to form a graphite preform/amorphous carbon matrix C/C composite. The product is still considerably more expensive than similar polymeric composites because of the cost of preform construction, and the repeated resin infiltration and carbonization steps while not providing entirely satisfactory mechanical properties..

SUMMARY OF THE INVENTION

The present invention provides a method for the production of and a novel class of 3-D carbon cellular foams that demonstrate extremely high fracture toughness and fracture strain, and CIC composites incorporating such novel cellular foams. Because of the micron size of the bubbles in these novel carbon foams and their crystalline morphology, they form an extremely strong network with unidirectional fibers and woven fabrics. As a consequence, although the C/C composites of the present invention are lighter than prior art such materials, they possess much higher specific mechanical properties and demonstrate higher impact resistance than such prior art C/C composites.

The fracture toughness and fracture strain of the foams of the present invention are an order of magnitude greater than those of similar prior art carbon foams. For example, existing carbon foams fracture at about 1.2% of strain whereas the carbon foams of the present invention fracture at about 42% of strain under compression loading..

Impregnation of unidirectional or woven fabrics with the carbon fiber precursor derived microcellular foams of the present invention provides an entirely new class of C/C composites having a carbon microcellular foam matrix as opposed to the glassy carbon matrix of conventional C/C composites. Concurrently, the method of the present invention allows this new class of C/C composites to be produced in a in a much faster and less expensive process than those of the prior art.

DETAILED DESCRIPTION

The process of the present invention permits the production of novel microcellular foams having ligament or strut dimensions that are similar to those of carbon fibers (5–10 μm) from carbon fiber precursors such as mesophase pitch or polyacrylonitrile.

Figure 1:
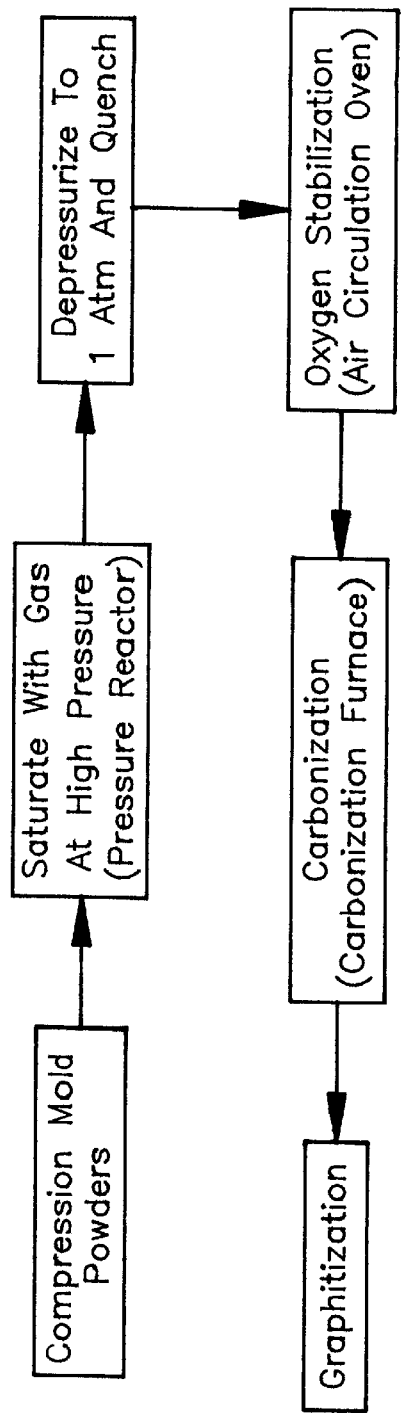
FIG. 1 is a block flow diagram of the process for producing the novel foams of the present invention.

As shown in FIG. 1, the process of the present invention comprises compression molding the carbon fiber precursor powder into an appropriate disc or part, saturating the disc or part with high-pressure gas, depressurizing and quenching. Conventional processing involving oxygen stabilization, carbonization and, optionally, graphitization complete the fabrication.

The methods and materials of the present invention can use a variety of carbon fiber precursors. For purposes of demonstration herein, a mesophase pitch material is used, however any suitable pitch-based or PAN-based carbon fiber precursor may be used. The particular material used for demonstration purposes herein is ARA24ZPP produced by the catalytic polymerization of naphthalene and sold by Mitsubishi Gas Chemical Company, Inc., Mitsubishi Building, 5-2 Marunouchi 2-chome, Chiyoda-ku, Tokyo, Japan. Any carbon fiber precursor that is crystalline is highly preferred in the successful practice of the invention, as this allows ease of aligning of the carbon planes during the blowing or depressurization step.

Before the start of compaction and compression, the carbon fiber precursor material should be in the form of a powder, Hence, if the material is received in the form of pellets, is should be ground to a fine powder before the start of production. Once in powder form, the powder is compression molded into disks or other shapes using a hydraulic press at a pressure over 10 Ksi.

Foaming is accomplished in a pressure vessel by first saturating the compression molded part with an inert fluid, such as nitrogen, carbon dioxide, helium, argon, etc. while raising the temperature of the reactor. Fluid as used in this disclosure is generic to both gas and liquid. Heat up can be at a rate of from about 0.5° C./min up to about 5° C./min. Care should be exercised at the higher heat-up rates due to the potential for sample microcracking. The pressure is raised to over 800 psi, preferably over 3000 psi and held for at least 15 minutes. Holding periods of up to 40 minutes have been found useful for conventionally sized parts, however, for larger parts, longer holding periods may be necessary/useful. Gas saturation should occur above the glass transition temperature of the carbon fiber precursor material, although the gas can be introduced at any time during the beat-up process. In the case of the material from Mitsubishi Gas and Chemical, saturation was reached in about 15–30 minutes at a temperature of from about 280° C. to about 300° C. Gas saturation is relatively poor at temperatures below the glass transition temperature since the crystalline structure of the carbon planes prevents the gas molecules from penetrating into the bulk pitch. Thus, the application of high gas pressure prior to attaining the glass transition temperature does not materially affect the saturation time.

Upon completion of the gas saturation step, pressure is suddenly released by opening a valve and quenching is accomplished by injecting a fluid such as liquid nitrogen, nitrogen or another appropriate inert gas such as carbon dioxide, argon helium, etc. into the pressure vessel. The sudden release of the pressure at the end of the saturation cycle results in a thermodynamic instability, and bubbles are formed with a uniform distribution. Gas inlet pressure is controlled by a gas regulator. Quenching may be performed at pressures up to about 100 psi. Faster quenching results in the formation of smaller bubbles and higher foam density. Higher gas saturation pressure results in smaller bubble size. Hence, the density of the resulting foam can be controlled by the saturation pressure and the quenching rate. Once the temperature has dropped below the glass transition temperature of the carbon fiber precursor material, the cooling rate should be slowed to less than about 3° C./min. Foams having bubbles or cells on the order of from about $10\,\mu$ up to about $100\,\mu$ can be made with the process of the present invention.

Testing and examination have shown that the blowing process, due to the high saturation pressure, aligns the carbon planes along the struts, i.e. ligaments between the foam bubbles, imparting a morphology resembling that of carbon fibers with the concomitant high mechanical properties associated with such a structure.

In an alternative embodiment of the carbon foam manufacturing process, a particulate of small particle size, on the order of 1.5 $\mu m$ can be used as a nucleating agent. Talc powder of this dimension has been found particularly useful in this regard. According to this embodiment, a small amount, about 0.5% to about 2% by weight, of the nucleating agent powder is blended with the dry pitch in a ball mill prior to compression molding the pitch into a disc or preform. The remaining processing steps are the same as those for a foam which contains no nucleating agent.

After fabrication as just described, the foams are oxygen stabilized in a circulating oven, carbonized in a furnace with a nitrogen atmosphere and, finally, graphitized in a graphite vacuum furnace.

In the oxygen stabilization step, the graphite planes are cross-linked and become infusible. Oxygen stabilization is necessary so that the pitch does not melt during the subsequent carbonization step. Oxygen stabilization is preferably performed at between about 220° C. and about 240° C. in an air or oxygen atmosphere. Heat up may be at a constant about 1° C./min to about 10° C./min or stepwise. An exemplary stepwise heat-up would be as follows: 5° C./min up to 150° C., hold for 1 hour; 5° C./min up to 180° C., hold for 1 hour, 5° C./min up to 220° C., hold for 72 hours, then cool down at a rate of 5° C./min or slower to ambient. Oxygenation can be accelerated through the use of oxygen gas rather than ambient air in the furnace. The time of oxygen stabilization will be dependent upon the thickness of the sample.

Carbonization can be performed in a furnace in a nitrogen atmosphere. The material is heated up slowly at a rate of from about 10° C./min to about 5° C./min to from about 600° C. to about 1000° C. and held for an appropriate length of time, e.g. 1 hour and then cooled down slowly, for example at about 5° C./min to room temperature.

Graphitization, if desired because the foam is to be graphitic, is accomplished in a graphite vacuum furnace using conventional practice for graphitization of carbon fibers. A typical such practice involves heating up at about 1 to about 5° C./min to from about 2200 to about 2300° C. in a vacuum, holding at this temperature for about 1 hour, then cooling down at less than about 5° C./min.

Relatively slow heating and cooling rates in all of these latter processes are necessary to prevent microcracking on the carbon foam matrix.

Materials produced in accordance with the method of the present invention can be analyzed using a scanning electron microscope (SEM). The photomicrographs can be used to obtain an estimation of bubble density, cell size and strut size. The mechanical properties are determined using dog-bone tensile specimens and cubicle specimens for compression testing. The crystal orientations of the foams can be determined using fluorescence and polarized light microscopy. Foam samples should be vacuum impregnated with a fluorescently-tagged epoxy potting resin and polished using conventional metallographic techniques. Optical microscopy can be performed using a microscope equipped with fluorescent illumination or a polarizing microscope. The quantitative measurement of bubble size and cross-section can be obtained using an image analysis system taking images directly from a microscope.

The C/C composites of the present invention comprise graphite fabrics, unidirectional or woven, impregnated with the foamed carbon fiber precursors just described. To form such structures, carbon fibers are layered with carbon fiber precursor material, as described below, and formed into discs or preforms and subjected to the same process used to produce the foams described hereinabove, gas saturation followed by pressure release and quenching. The combined pitch foam-green carbon fiber forms are then oxygen stabilized in a circulating oven, carbonized in a furnace with a nitrogen atmosphere and, finally, graphitized in a graphite vacuum furnace. Operating parameters for this processing are similar to those described above for the production of the crystalline foams.

To process large parts, the process parameters are generally the same as those described above. Of course, in order to obtain the same quench rates etc. a larger vent tube must be used for quick release of the saturation pressure and a deep tube with multiple holes should be used to obtain even release of the pressure inside of the pressure reactor.

Figure 2:
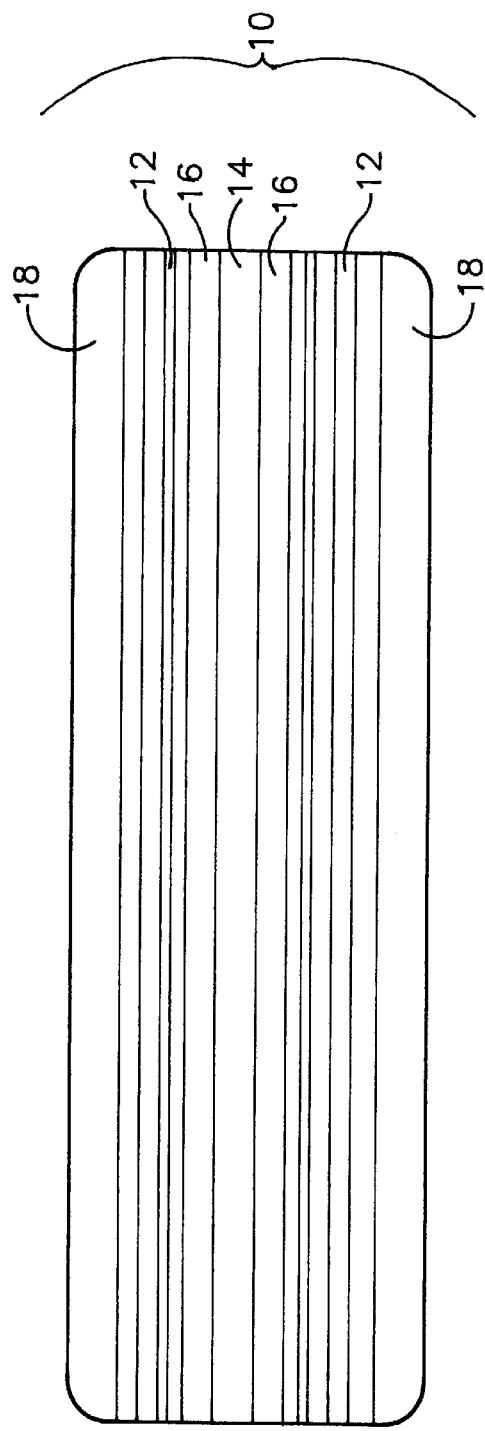
FIG. 2 is a cross-sectional view of a C/C composite of the present invention.

A first category of C/C composites can be fabricated using continuous unidirectional fabrics as the reinforcement for a crystalline carbon foam. Any suitable continuous unidirectional carbon fabric may be used for the production of these C/C composites, however, in the examples and diagrams which follow, Torayca, T300, T130 manufactured by Toray Industries, Inc., Toray Building, 2-1 Nihonbashi-Muromachi 2-chome, Chuo-ku, Tokyo 103, Japan was used. The unidirectional fabrics are cut to the size of the forming die or part to be formed and placed in one direction in the die. A layer of fiber precursor pitch powder (mesophase pitch) of the type described hereinabove is then sprayed evenly over the fabric. A second layer of fabric is then layered in the die at right angles to the first and another layer of fiber precursor pitch powder sprayed thereon. This procedure is repeated until the desired thickness is achieved. The layered structure has the cross-section depicted generally in FIG. 2 wherein composite structure 10 comprising fiber layer 14 layered between two layers 16 of fiber precursor pitch, and fabric layers 12 placed at right angles to fabric layer 14 also covered with layers 18 of fiber precursor pitch. This composite structure is then processed as described above for the production of the crystalline foams, i.e. compression molded, saturated with gas at high pressure and elevated temperature, depressurized and quenched, oxygen stabilized, carbonized and graphitized. The process parameters for these various operations is as described above for the processing of the crystalline foams.

A second class of C/C composites can be fabricated using the same procedures, but using woven fabrics as the reinforcing member. The preparation and processing procedures for such materials are the same as those for the unidirectionally reinforced composites. Because of the constraints in both the x and y directions which occur with the woven fabrics, thermal residual stresses can more easily build up in these materials than in the case of the unidirectional fabric. Consequently, it is even more critical in these materials that quenching proceed slowly after the foam has reached its glass transition temperature in the cool down period.

Because of the differences in the coefficients of thermal expansion in the carbon fabrics and the pitch/Pan foam, special attention must be paid during the quenching step. The quenching step must proceed slowly after the foam has attained its glass transition temperature otherwise, microcracking in the foam or delamination in the composite will occur.

Near net shape structural components can be produced by preparing a mold which allows the fiber precursor pitch/PAN to expand in one direction only during the foaming process. During foam expansion, spherical bubbles will be formed in the regions with little constraint whereas elliptical bubbles will be formed in the regions where directional constraint exists. This provides for the ability to tailor mechanical performance directionally.

As mentioned above, the foams and C/C composites of the present invention have numerous potential uses in structural and other applications. Among these is as the core for a composite sandwich structure whose skins may be of any material, preferably a high temperature material such as titanium or ceramics. This sandwich material has potential applications in hot structures and cryogenic tanks.

EXAMPLES

EXAMPLE 1

Figure 3:
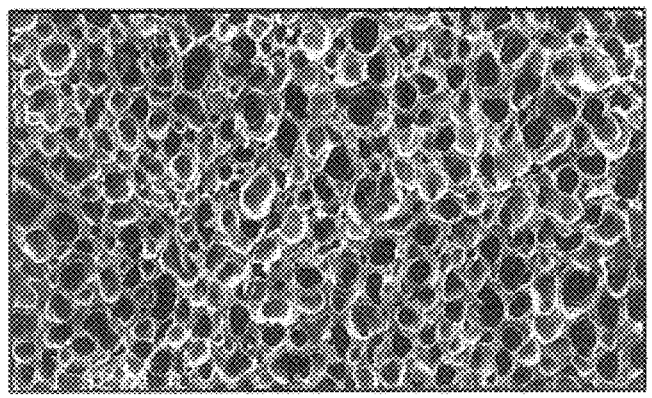
FIG. 3 is an SEM photomicrograph of a low to medium density carbon foam of the present invention.
Figure 4:
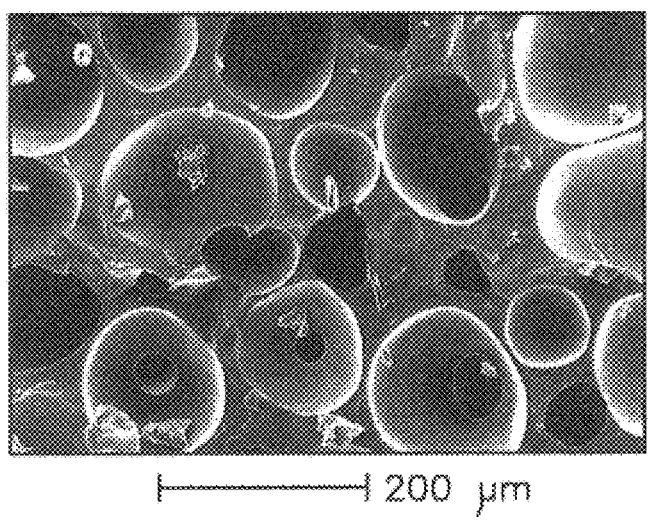
FIG. 4 is another lower magnification SEM photomicrograph of a low to medium density carbon foam of the present invention.
Figure 5:
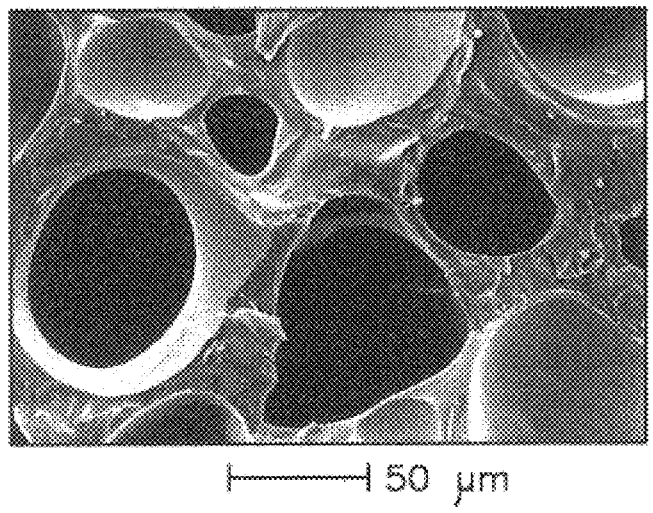
FIG. 5 is an SEM photomicrograph of a high density carbon foam of the present invention.
Figure 6:
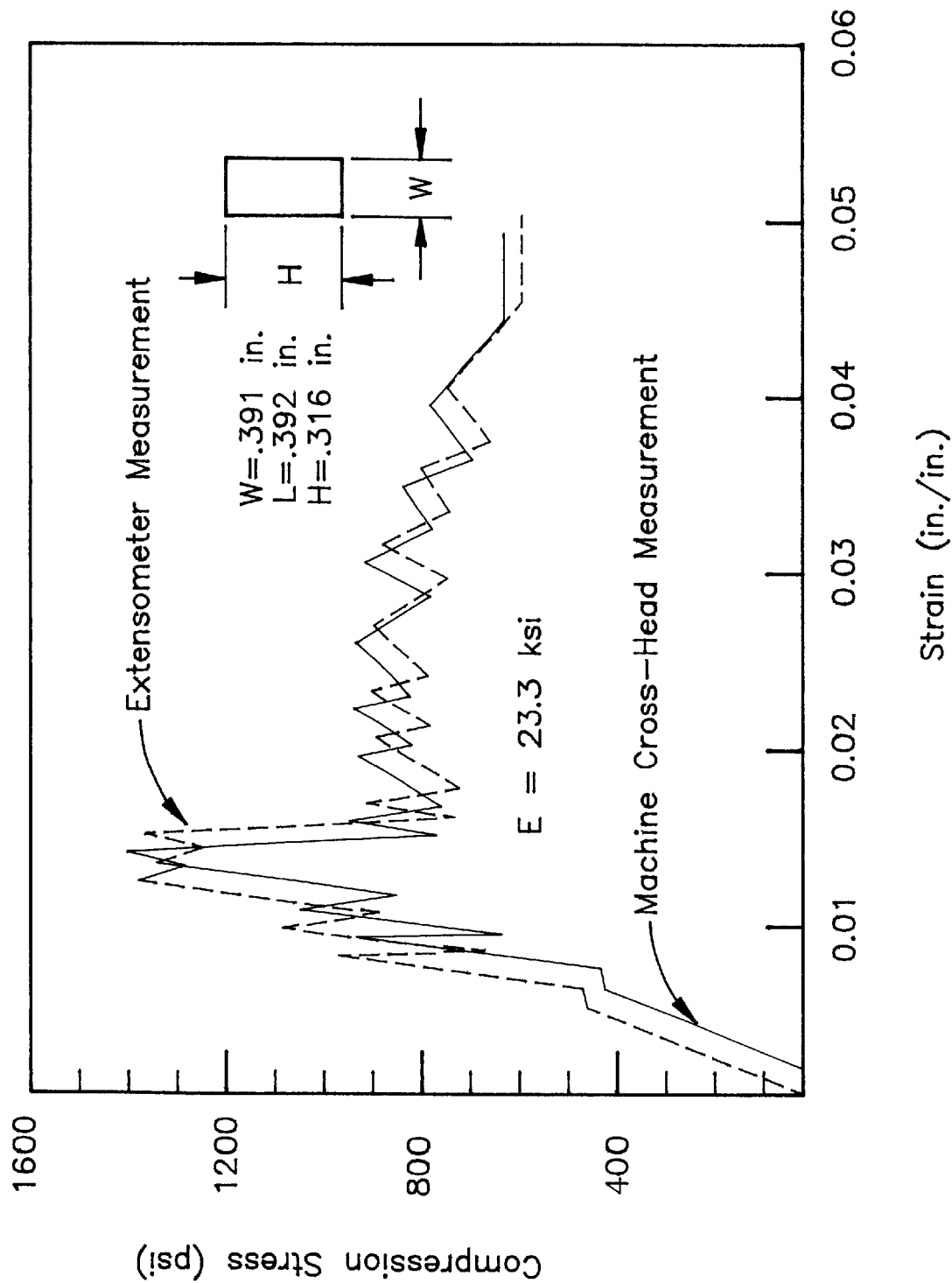
FIG. 6 is a graph of compression stress versus strain for the carbon foams of the present invention.
Figure 9:
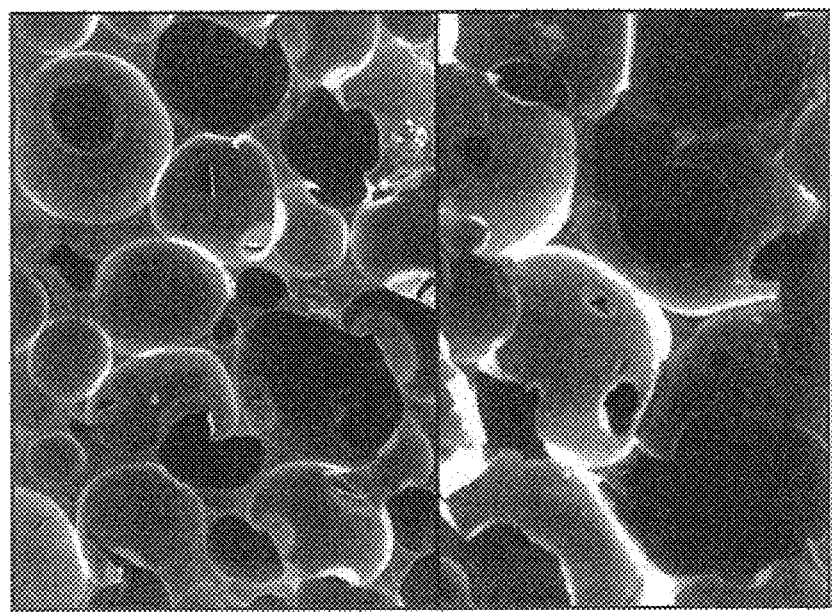
FIG. 9 is an SEM photomicrograph of a carbon foam of the prior art.
Figure 8:
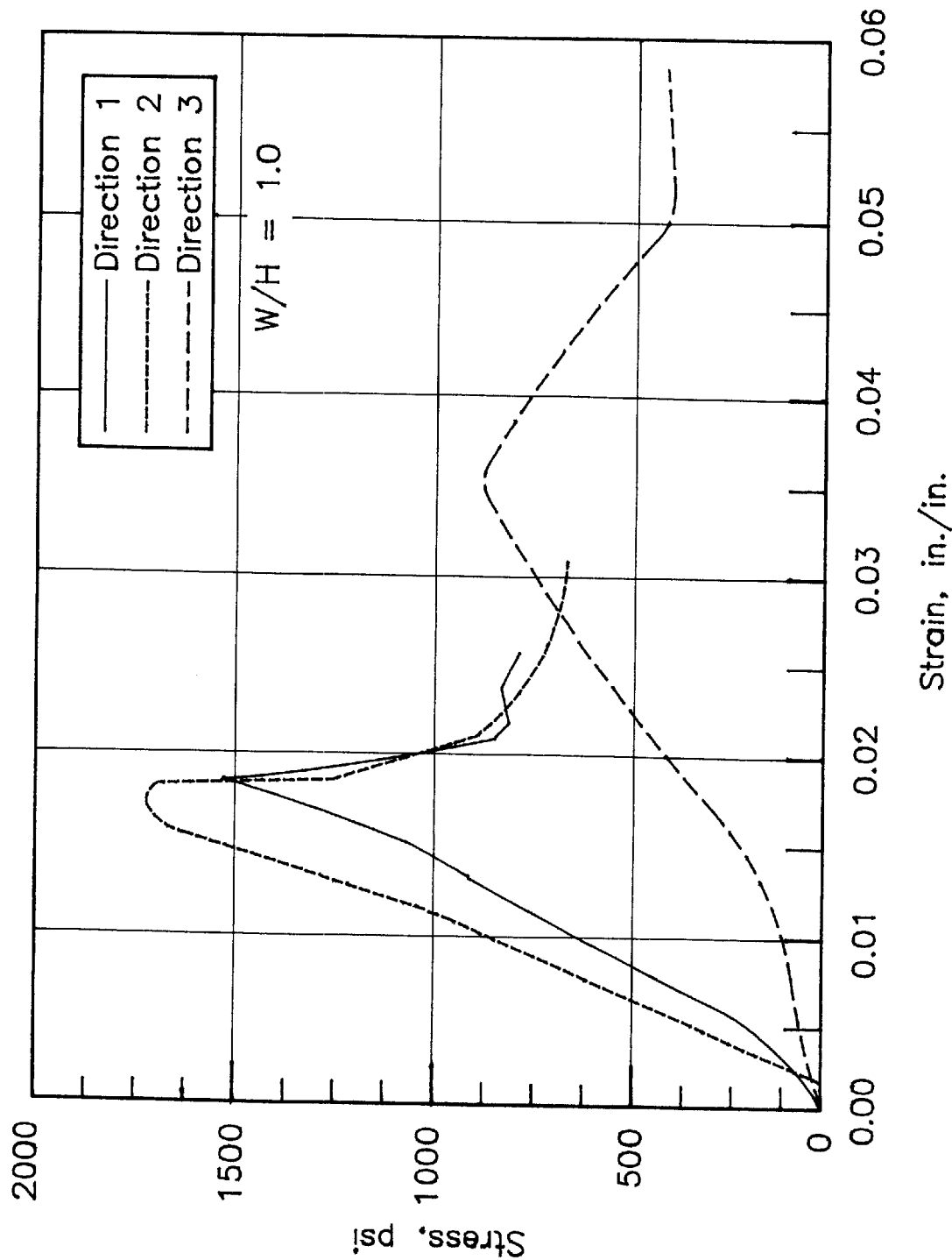
FIG. 8 is a stress versus strain curve of a carbon foam of the prior art.

A graphitized low to medium density fiber precursor foam was produced as described above by saturating with nitrogen at 3000–3800 psi. and at a temperature in the range of 280–300° C. As shown in FIGS. 3 and 4, the cell sizes are on the order of 50–80 $\mu$m and the ligaments or struts are about 7–10 $\mu$m. Cells having struts ranging from about 2 $\mu$m up to about 15 $\mu$m in thickness can be produced by the process of the present invention. By controlling the quench rate, a higher density foam as shown in FIG. 5 can be obtained. The stress-strain relationship of the low to medium density foam of FIGS. 3 and 4 is shown in FIG. 6. The fracture surfaces of the carbon foams shown in FIGS. 3–5 exhibit many heckles formations which are considered a sign of high fracture toughness. This is indeed borne out by the stress-strain curve shown in FIG. 6. Conventional carbon foams and C/C composites have low fracture strains (~1.2%) whereas the carbon foams of the present invention demonstrate fracture strains on the order of about 42%. Thus, the fracture toughness and fracture strain of the materials of the present invention are an order of magnitude higher than those of conventional glassy or amorphous foams. A representative stress strain curve of a typical prior art carbon foam is shown in FIG. 8 which demonstrates the significant differences in properties between these materials and those of the current invention. FIG. 9 is an SEM photomicrograph of a typical carbon foam of the prior art showing the difference in bubble size between the prior art foams and those of the present invention. The foams produced in this example have spherical bubbles that result in globally isotropic properties.

EXAMPLE 2

Figure 7:
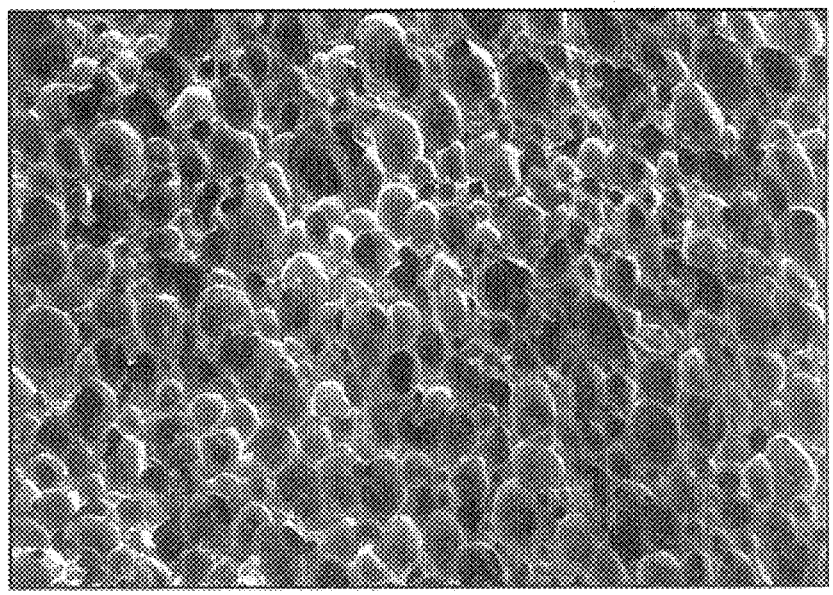
FIG. 7 is an SEM photomicrograph of a carbon foam of the present invention having elliptical bubbles.

The use of a container or die having two dimensions that are relatively close in size such that the carbon fiber precursor is permitted to expand in only a single plane during pressure release will permit obtaining elliptical bubbles as shown in FIG. 7. This creates an anisotropic carbon foam with higher mechanical properties along the major axis of the elliptical bubbles. Such morphology results in orthotropic properties which have applications in long structural parts. Thus, the major to minor axis of the bubbles can be tailored by the quenching rate of the foaming process as well as the shape of the die used.

In summary, shown in Table 1 below are comparative properties of prior art carbon foams and those of the present invention. In this table, A is a reticulated carbon foam, B is an earlier cellular carbon foam, and C is the microcellular foam of the present invention.

TABLE 1

| Carbon Foam | A | B | C |
|---|---|---|---|
| Fracture Strain % | 1~2 | 1.5~3 | 20~42 |
| Specific Compressive Strength, $10^5$ cm | 0.85 | Ave. 3.24 | >2.53 |
| Specific Fracture Energy (Mpa) | 0.049 | 0.325 | 6.647 |

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention is limited only by the scope of the appended claims.

What is claimed is:

1. A microcellular carbon foam made by a process comprising;
   a) saturating a body of a carbon fiber precursor with fluid at elevated temperature and pressure;
   b) releasing said pressure suddenly;
   c) quenching with an inert fluid to form a foam;
   d) oxygen stabilizing said foam; and
   e) carbonizing said foam.

2. The microcellular carbon foam of claim 1 wherein said body of carbon fiber precursor is formed by compression molding into an appropriate shape at elevated pressure prior to saturation and said foam is graphitized after carbonizing.

3. The microclellular carbon foam of claim 2 wherein said carbon fiber precursor is selected from the group consisting of mesophase pitch and polyacrylonitrile-based carbon fiber precursors.

4. The microcellular carbon foam of claim 2 wherein said saturation is accomplished by heating said shape in a pressure vessel to a temperature above the glass transition temperature of said carbon fiber precursor and at a pressure above about 800 psi in an inert atmosphere and holding these conditions for at least 15 minutes.

5. The microcellular carbon foam of claim 1 comprised of bubbles on the order of from about 10 $\mu$m to about 100 $\mu$m in size.

6. The microcellular carbon foam of claim 5 wherein said bubbles have struts ranging in thickness from about 2 $\mu$m to about 15 $\mu$m.

7. The microcellular carbon foam of claim 5 which demonstrates fracture strains greater than about 20%.

8. A microcellular carbon foam derived from a carbon fiber precursor and having: 1) a fracture strain of between about 20% and about 42%; 2) a specific compressive strength above about $2.53 \times 10^5$ cm; 3) and a specific fracture energy of about 6.6.

* * * * *